(12) United States Patent
Smart

(10) Patent No.: US 7,980,230 B2
(45) Date of Patent: *Jul. 19, 2011

(54) FUEL ECONOMIZER FUEL VAPOR SYSTEM FOR INTERNAL COMBUSTION ENGINE

(75) Inventor: Christopher Smart, Mounds, OK (US)

(73) Assignee: Advanced Mileage Technologies, LLC, Little Silver, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/791,624

(22) Filed: Jun. 1, 2010

(65) Prior Publication Data

US 2011/0088665 A1    Apr. 21, 2011

Related U.S. Application Data

(63) Continuation of application No. 12/652,986, filed on Jan. 6, 2010, now Pat. No. 7,886,725.

(60) Provisional application No. 61/251,913, filed on Oct. 15, 2009.

(51) Int. Cl.
*F02M 33/08* (2006.01)
*F02G 5/00* (2006.01)

(52) U.S. Cl. ........................................ 123/557; 123/514

(58) Field of Classification Search .................. 123/543, 123/545, 546, 557, 298, 305, 510, 511, 514, 123/522, 523, 524

See application file for complete search history.

(56) References Cited

U.S. PATENT DOCUMENTS

| | | |
|---|---|---|
| 1,782,602 A | 11/1930 | Brush |
| 2,104,974 A | 1/1938 | Dawes |
| 2,991,777 A | 7/1961 | Foreman et al. |
| 3,498,279 A | 3/1970 | Seeley |
| 3,794,000 A * | 2/1974 | Hodgkinson ................. 123/557 |
| 3,913,543 A | 10/1975 | Richard |
| 3,935,849 A | 2/1976 | Mills |
| 3,939,813 A | 2/1976 | Harrow et al. |
| 3,987,773 A | 10/1976 | Harrow et al. |
| 4,003,356 A | 1/1977 | Naylor |
| 4,015,570 A | 4/1977 | Sommerville |
| 4,083,340 A | 4/1978 | Furr et al. |
| 4,192,266 A | 3/1980 | Duckworth |
| 4,303,051 A * | 12/1981 | Weishaar ..................... 123/557 |
| 4,323,043 A | 4/1982 | Alderson |
| 4,325,341 A | 4/1982 | Yamanchi et al. |
| 4,341,194 A | 7/1982 | Wolters et al. |
| 4,349,001 A | 9/1982 | Wagner |
| 4,367,717 A | 1/1983 | Ray |
| 4,395,995 A | 8/1983 | Crain |

(Continued)

*Primary Examiner* — Hai Huynh

(74) *Attorney, Agent, or Firm* — Head, Johnson & Kachigian, P.C.

(57) ABSTRACT

A fuel vaporizer for an internal combustion engine having a closed pressure chamber defining a volume, to be heated, and a liquid fuel supply system disposed to emit a liquid fuel spray. The closed pressure chamber may be constructed and arranged relative to the heat-transfer surface to establish between the at least one outlet and the heat-transfer surface a mixing domain in which the fuel spray, as it progresses through the volume from the outlet, is substantially heated and vaporized by mixing with re-circulated, heated fuel vapor that previously has moved over and received heat from the heat transfer surface. The fuel vaporizer may be associated with a vapor outflow passage through which pressurized vapor exits the closed pressure chamber for supply to said at least one combustion region. The heat-transfer surface may be arranged to be heated by engine coolant circulating around the exterior of the closed pressure chamber.

6 Claims, 4 Drawing Sheets

U.S. PATENT DOCUMENTS

| | | | | |
|---|---|---|---|---|
| 4,422,429 | A | 12/1983 | Reed | |
| 4,442,819 | A * | 4/1984 | Veach | 123/557 |
| 4,476,840 | A * | 10/1984 | Budnicki et al. | 123/557 |
| 4,476,841 | A | 10/1984 | Duckworth | |
| 4,483,305 | A | 11/1984 | Gilmor | |
| 4,483,307 | A | 11/1984 | Gilmor | |
| 4,510,913 | A | 4/1985 | deCelle | |
| 4,528,967 | A | 7/1985 | Bart | |
| 4,567,857 | A | 2/1986 | Houseman et al. | |
| 4,594,991 | A | 6/1986 | Harvey | |
| 4,679,539 | A | 7/1987 | Storbakken | |
| 4,722,314 | A | 2/1988 | Martinson | |
| 4,784,092 | A | 11/1988 | Pitti | |
| 4,829,969 | A | 5/1989 | Ray | |
| 4,836,173 | A | 6/1989 | Stires, Jr. | |
| 4,846,137 | A | 7/1989 | Ray | |
| 4,883,040 | A | 11/1989 | Rocky | |
| 4,955,351 | A * | 9/1990 | Lewis et al. | 123/557 |
| 5,019,120 | A * | 5/1991 | Lewis et al. | 123/557 |
| 5,035,227 | A | 7/1991 | Hansen | |
| 5,118,451 | A | 6/1992 | Lambert, Sr. et al. | |
| 5,215,065 | A | 6/1993 | Snyder | |
| 5,257,609 | A | 11/1993 | Reed et al. | |
| 5,291,870 | A | 3/1994 | Covey, Jr. | |
| 5,327,875 | A | 7/1994 | Hall | |
| 5,443,053 | A * | 8/1995 | Johnson | 123/557 |
| 5,540,198 | A * | 7/1996 | Hurner | 123/179.21 |
| 5,746,188 | A | 5/1998 | Cooke | |
| 5,782,225 | A | 7/1998 | Caggiano | |
| 5,850,821 | A * | 12/1998 | Curtis | 123/524 |
| 6,213,104 | B1 * | 4/2001 | Ishikiriyama et al. | 123/557 |
| 6,227,151 | B1 * | 5/2001 | Ma | 123/3 |
| 6,237,575 | B1 | 5/2001 | Lampert et al. | |
| 6,371,090 | B1 * | 4/2002 | Howell | 123/522 |
| 6,725,846 | B2 | 4/2004 | Armstrong | |
| 6,758,194 | B2 | 7/2004 | Shetley et al. | |
| 6,769,421 | B2 * | 8/2004 | Newhouse et al. | 123/557 |
| 6,868,839 | B2 * | 3/2005 | Chu | 123/557 |
| 7,415,975 | B2 | 8/2008 | Lerner | |
| 7,444,230 | B2 | 10/2008 | Cheiky | |
| 7,478,628 | B2 | 1/2009 | Hines | |
| 7,546,826 | B2 | 6/2009 | Cheiky | |
| 7,644,705 | B2 | 1/2010 | Ozdemir | |
| 7,657,363 | B2 | 2/2010 | Cheiky | |
| 2003/0116143 | A1 | 6/2003 | Armstrong | |
| 2003/0127076 | A1 * | 7/2003 | Wijaya | 123/557 |
| 2003/0234455 | A1 | 12/2003 | Mieney et al. | |
| 2004/0200461 | A1 | 10/2004 | Chu | |
| 2005/0188963 | A1 | 9/2005 | Stoddard | |
| 2005/0193993 | A1 | 9/2005 | Dale | |
| 2005/0279334 | A1 | 12/2005 | Lerner | |
| 2006/0065254 | A1 * | 3/2006 | Okabe et al. | 123/557 |
| 2006/0249129 | A1 | 11/2006 | Ozdemir | |
| 2007/0169761 | A1 * | 7/2007 | Price | 123/557 |
| 2008/0053416 | A1 | 3/2008 | Hines | |
| 2008/0078363 | A1 | 4/2008 | Apperson | |
| 2008/0257315 | A1 | 10/2008 | Thomas | |

* cited by examiner

FUEL ECONOMIZER FUEL VAPOR SYSTEM FOR INTERNAL COMBUSTION ENGINE

CROSS-REFERENCE

This application claims priority to U.S. Utility patent application Ser. No. 12/652,986, filed Jan. 6, 2010, and U.S. Provisional Patent Application Ser. No. 61/251,913, filed Oct. 15, 2009, both incorporated in their entireties herein by reference.

BACKGROUND OF THE INVENTION

1. Field of the Invention

The present invention relates to a system that transforms liquid fuel into fuel vapor in order to improve combustion in internal combustion engines.

2. Prior Art

The manner in which fuel is provided to an engine significantly affects both fuel efficiency and exhaust emissions. In a piston engine with a carburetor, liquid gasoline is introduced centrally to a flow of combustion air, following which the air-fuel mixture is divided and distributed to the engine cylinders. In a piston engine with fuel injectors at the cylinders, pressurized liquid fuel is forced through nozzles of the injectors to inject sprays of liquid fuel particles. The sprays are injected into combustion air at the inlet ports of the cylinders or directly into the combustion regions. Incomplete combustion of the fuel in these and other engines detrimentally affects fuel economy and produces harmful emissions.

Over many decades, suggestions have been made to prevaporize fuel as a way to improve fuel efficiency and decrease emissions of internal combustion engines.

Cooke (U.S. Pat. No. 5,746,188) and Shetley (U.S. Pat. No. 6,758,194) illustrate examples of fuel vaporization systems using electric heating elements.

Notwithstanding the foregoing, there is considerable room to improve fuel efficiency and decrease emissions in internal combustion engines.

It would be desirable to provide a fuel economizer fuel vapor system that may be adapted for new vehicles and may be adapted to add to existing vehicles.

Additionally, it would be desirable to provide a fuel economizer fuel vapor system that includes a specially designed pressurized container for vaporization of liquid gasoline.

Additionally, it would be desirable to provide a closed loop fuel vapor system that restricts entry of atmospheric air therein.

SUMMARY OF THE INVENTION

A fuel vaporizer for an internal combustion engine includes a first closed chamber defining a first volume, a heat transfer surface within the first closed chamber, a second closed chamber at least partially surrounding the first closed chamber defining a second volume, a liquid fuel supply system comprising a liquid fuel supply line, and a fuel spray nozzle disposed to emit into the first volume under super-atmospheric pressure an expanding pattern of liquid fuel spray. A thermal fluid system introduces heated fluid into the second volume and transfers heat from the heated fluid through the first closed chamber. A vaporized fuel outlet is configured to direct vaporized fuel from the first closed chamber to a combustion fuel supply line that supplies fuel to at least one combustion region of the engine.

In some embodiments, the heat transfer surface of the first closed chamber is a wall of the first closed chamber. Optionally, the heat transfer surface may be a member of increased surface area that is in thermal communication with the wall of the first closed chamber.

The vaporizer system may also include an optional pressure relief valve that may be configured to open when the pressure inside the first closed chamber exceeds a predetermined threshold and direct vaporized fuel to the liquid fuel supply system.

The present invention also provides a method of supplying fuel to at least one combustion region of an internal combustion engine including introducing heated coolant fluid into a volume, the volume at least partially surrounding a vapor chamber, transferring heat from the heated coolant fluid to the vapor chamber, supplying fuel to the vapor chamber via a liquid fuel supply line, emitting into the vapor chamber a substantially liquid fuel at super-atmospheric pressure, vaporizing the substantially liquid fuel in the vapor chamber, and expelling the vaporized fuel from the vapor chamber to a combustion chamber fuel supply line.

The present invention may further include the steps of receiving, at a liquid fuel bypass valve, a signal indicating that the vaporized fuel from the vapor chamber is not sufficient to meet the fuel demands of the combustion region of the engine, at least partially opening the liquid fuel bypass valve, and bypassing the vapor chamber by diverting liquid fuel from the liquid fuel supply line to the combustion chamber fuel supply line. The present invention may also include returning liquid fuel from the vapor chamber to the liquid fuel supply line. Further methods may include opening a pressure relief valve upon the pressure in the vapor chamber exceeding a predetermined threshold.

The present invention may include a fuel vaporizer for an internal combustion engine comprising a closed pressure chamber defining a volume, a heat transfer surface associated with the volume to be heated, and a liquid fuel supply system to emit into the volume under super-atmospheric pressure an expanding pattern of liquid fuel spray from at least one orifice, the liquid fuel supply system emitting fuel into the volume for vaporization. The closed pressure chamber may be constructed and arranged relative to the heat-transfer surface to establish between the at least one outlet and the heat-transfer surface a mixing, in which the fuel spray, as it progresses through the volume from the outlet, is substantially heated and vaporized by mixing with heated fuel vapor that previously has moved over and received heat from the heat transfer surface. Through a vapor outflow passage, pressurized vapor exits the closed pressure chamber for supply to said at least one combustion region. The heat-transfer surface may be arranged to be heated at least partially by a fluid coolant circulating around the exterior of the closed pressure chamber.

The present invention may further include a second closed chamber that at least partially surrounds the closed pressure chamber and defines a volume through which the engine coolant is circulated. The engine coolant entering through an engine coolant inlet is or a higher temperature than an engine coolant exiting through the engine coolant outlet.

The present invention may also include a flow control associated with the vaporizer outflow passage, the flow control including at least one fuel vapor spray nozzle communicating directly or indirectly with at least one combustion region adapted to be actuated in response to requirements, the fuel vaporizer constructed and arranged to enable flow of pressurized fuel vapor to the engine while maintaining substantial super-atmospheric pressure within the volume in which the vapor is generated.

The details of selected designs within the scope of the invention are set forth in the accompanying drawings and the description below.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
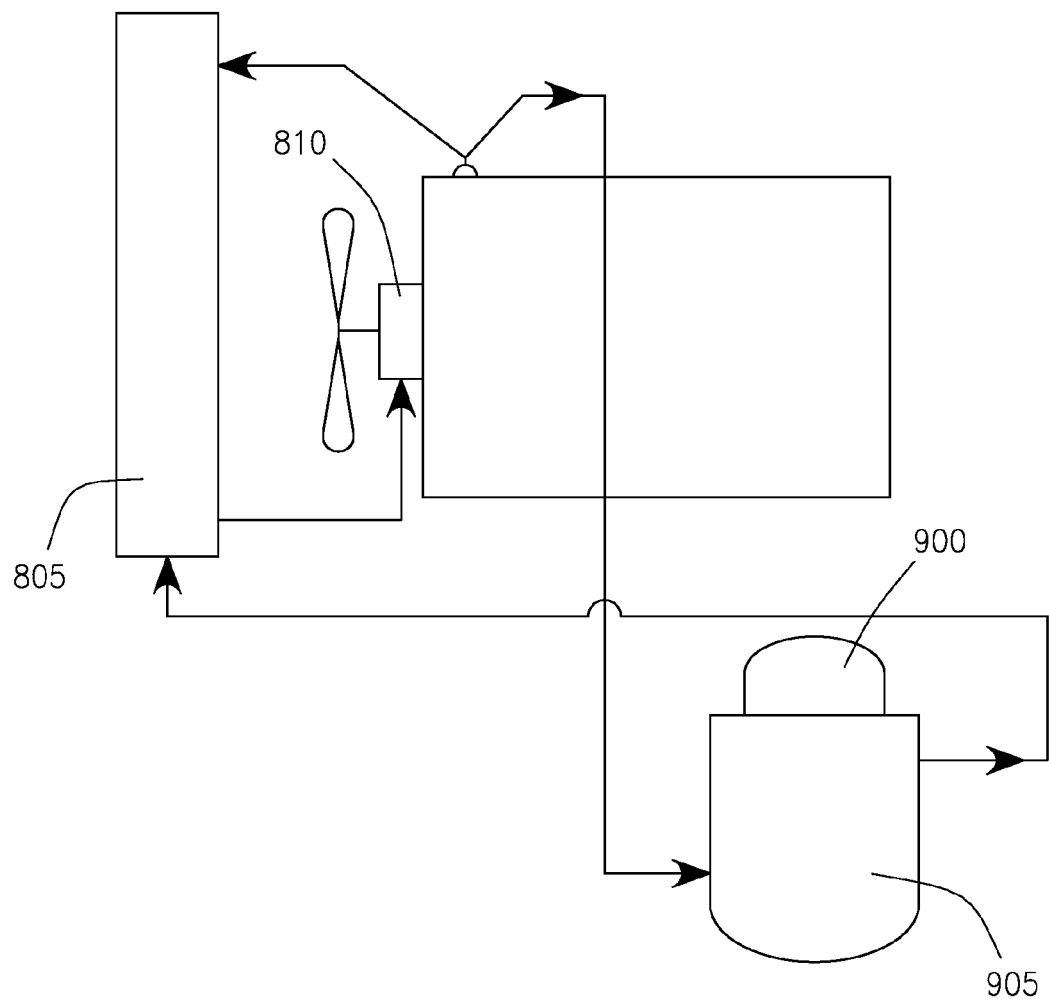
FIG. 1 is a simplified schematic illustration of a fuel vapor system of the present invention in relation to an internal combustion engine and its fluid coolant system.

Preferred embodiments of the present invention are illustrated in FIGS. 1 through 4 wherein engine coolant is used to heat a vapor chamber. FIG. 1 illustrates a simplified schematic of the present invention in relation to a known internal combustion engine and fluid coolant system.

A vapor chamber 900 (to be described in detail below) is at least partially surrounded by a coolant chamber 905 (to be described in detail below). In known liquid cooled internal combustion engines, a liquid such as a coolant is delivered to and through channels running through the engine and cylinder head. The liquid may be water but is commonly a mixture of water and anti-freeze, such as ethylene glycol or propylene glycol. Fluid coolant from a vehicle thermal fluid system is circulated from an internal combustion engine 800 through a radiator 805 and then returned to the engine. The fluid coolant is also circulated from the engine 800 into the coolant chamber 905. After passing through the coolant chamber, the coolant fluid is returned to the engine 800. The coolant is circulated, in a closed loop through the coolant system by a pump 810.

The coolant is thereafter delivered and returned to and through the radiator 805, so that heat is transferred from the fluid inside to the atmospheric air outside. A pump, such as a centrifugal pump 810, circulates the coolant through the system. The coolant operates in a closed system and is recirculated.

Figure 2:
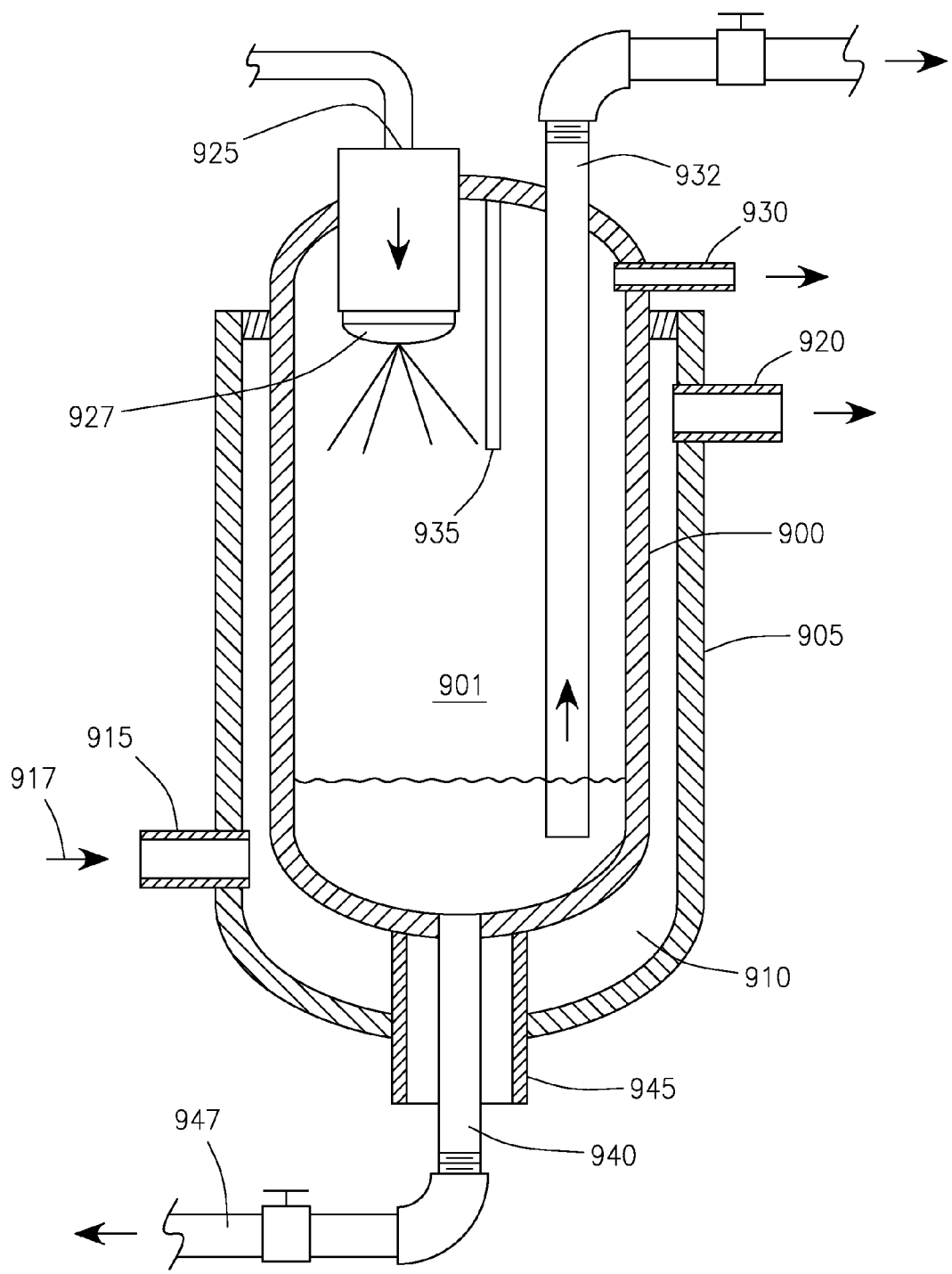
FIG. 2 is a cross-sectional view of a fuel vaporizer system for an internal combustion engine according to an exemplary embodiment of the present invention.

In the embodiment illustrated in the sectional view of FIG. 2, a vapor chamber 900 is at least partially surrounded by a coolant chamber 905 thereby creating a coolant cavity 910.

In a preferred embodiment in FIG. 2, relatively hot liquid coolant from the engine enters through a coolant inlet 915 into the coolant cavity 910 as shown by arrow 917, flows around the exterior of the vapor chamber 900 and exits the coolant cavity 910 at a coolant exit 920. The hot coolant serves to heat the vapor chamber 900 by transferring heat from the coolant to the relatively cooler vapor chamber 900. As the fuel inside the vapor chamber is heated, the fuel will expand and be converted to its gaseous form. The vapor chamber 900 is a closed pressure vessel and preferably is designed with a cylindrical center and a pair of spherical ends for optimal strength.

In various embodiments, the exterior of the vapor chamber 900 may include fins or other surface-enhancing elements (not shown) to increase the amount of heat transfer from the coolant to the vapor chamber 900. Further, the vapor chamber 900 may be made of a material with a high thermal conductivity to promote heat transfer from the coolant through the walls of the vapor chamber to the fuel in the vapor chamber. The coolant chamber 905 may be made of an insulative material or material with a low thermal conductivity to promote retention of heat within the coolant chamber 905, further promoting heat transfer to the vapor chamber 900.

In the preferred embodiment of FIG. 2, the coolant may be drawn from a standard thermal fluid cooling system of a vehicle as is well known in the art, preferably when the coolant is at or near its highest temperature such as after passing through the engine and at or near the thermostat entering the radiator. Directing the highest temperature coolant available to the vaporize the fuel provides more efficient operation.

Further to the embodiment illustrated in FIG. 2, a fuel inlet 925 for the vapor chamber 900 may include a spray nozzle 927. The force of the existing fuel pump (not shown) of the internal combustion engine moves fuel into the vapor chamber 900. Fuel entering the vapor chamber is substantially liquid in form. Application of heat will cause the liquid fuel to be converted to gaseous form. After vaporization, vaporized fuel outlet 930 is provided to allow vaporized fuel to exit the vapor chamber 900 for supplying to at least one combustion region of an internal combustion engine 800. The vaporized fuel outlet 930 is shown as being at the same end of the vapor chamber 900 as the fuel inlet 925 so that the vaporized fuel outlet is not generally aligned with the fuel inlet along the direction in which fuel is injected. This arrangement helps to promote recirculation of fuel vapor in the vapor chamber before the vapor exits the chamber through the vaporized fuel outlet 930.

A baffle 935 or baffles may be provided to discourage newly injected, substantially liquid fuel from being expelled through the vaporized fuel outlet 930. The baffle 935 may further serve as a heat sink to aid in the vaporization of the new fuel entering through the fuel inlet 925.

In at least one non-limiting embodiment, approximately 150 lbs of pressure is generated within the vapor chamber by expansion of the fuel into its gaseous form.

A drain or liquid fuel outlet 940 may be provided in the vapor chamber 900 to allow any liquid fuel which is not vaporized to exit the vaporization volume 901. Liquid fuel remaining in the vapor chamber 900 may be detrimental to the generation of vapor in the chamber 900 as the liquid fuel may absorb heat from the coolant and the liquid fuel compromises the volume available for the fuel entering the vapor chamber to be vaporized. The liquid fuel drain outlet 940 is preferably at the base of the vapor chamber 900 so that any liquid will migrate to the base by gravity. The liquid fuel outlet 940 may be controlled by a valve (not shown). The liquid fuel drain outlet 940 may be isolated from the coolant cavity 910 by a cylindrical shield 945 to prevent any exiting liquid fuel from further removing heat from the system. The liquid fuel removed from the vapor chamber 900 may be returned to the fuel tank or to the fuel line supplying the vaporizer as shown by line 947.

A secondary drain outlet 949 controlled by a valve may also be provided to remove liquid fuel.

Figure 3:
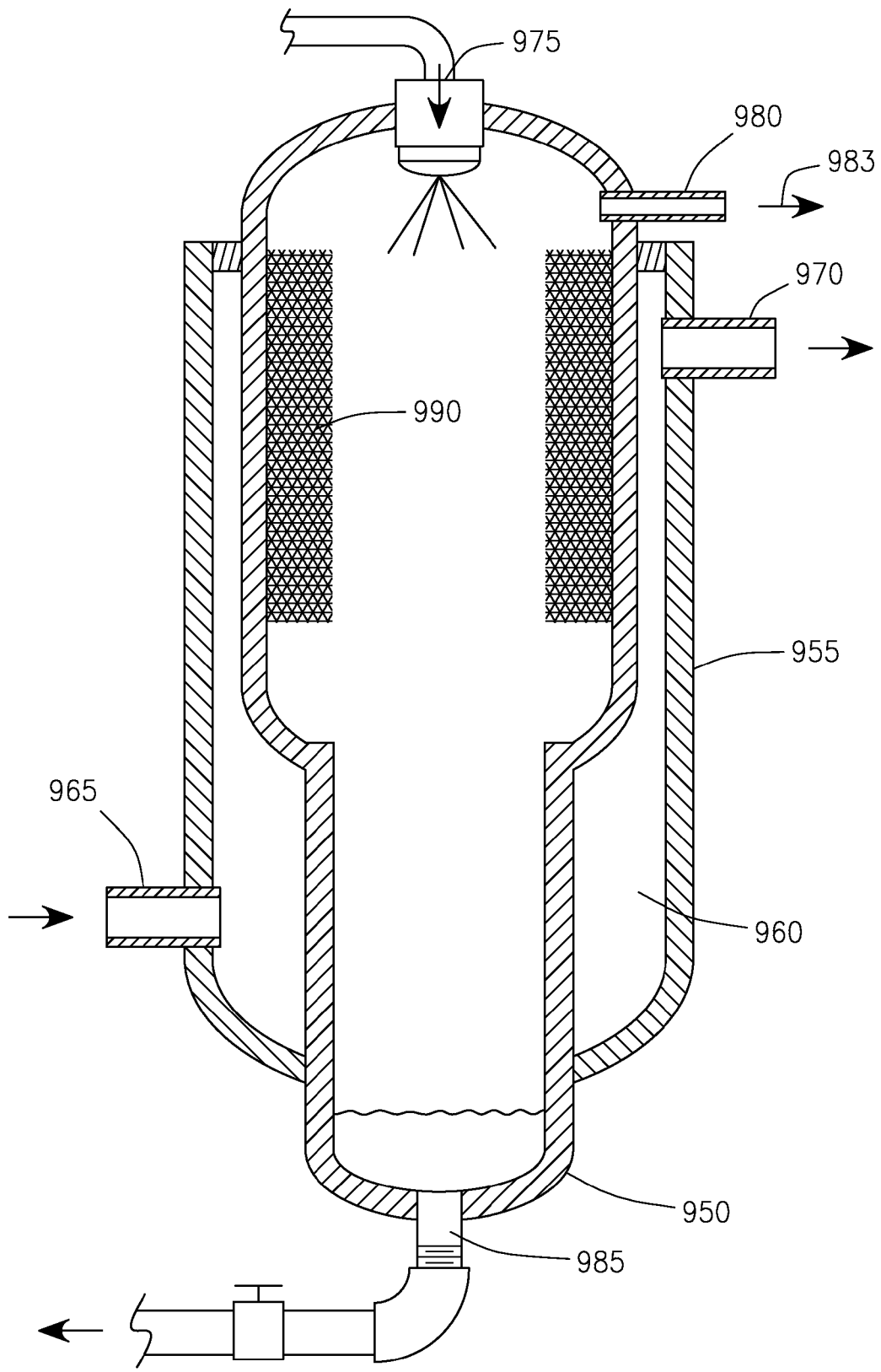
FIG. 3 is a cross-sectional view of a fuel vaporizer system for an internal combustion engine according to another exemplary embodiment of the present invention.

Another exemplary embodiment of the present invention is illustrated in the cross sectional view in FIG. 3. A vapor chamber 950 is substantially surrounded by a coolant chamber 955 forming a coolant cavity 960. The coolant cavity 960 includes both a coolant inlet 965 and a coolant outlet 970. The illustrated embodiment further includes a fuel inlet 975, shown with a spray nozzle, a vaporized fuel outlet 980 for supply to at least one combustion region as shown by arrow 983, and a liquid fuel drain outlet 985 for return to the fuel system.

A heat-exchange element 990 promotes efficient heat transfer between the vapor chamber 950 and the incoming fuel spray. The heat-exchange element 990 may be mesh or a finned member, but generally includes a region of greater surface area than would be available without the heat exchange element 990. The increased surface area provides a heat-exchange surface available to the incoming fuel surface providing more complete and efficient vaporization of the liquid fuel. The heat-exchange element may be of any material but is preferably of a material with a high thermal conductivity to promote heat exchange between the vapor chamber 950 wall and the heat-exchange element 990.

The fuel vaporization system of the present invention may further include provisions to ensure that the combustion regions are adequately supplied with fuel under varying conditions, such as cold start and heavy load scenarios.

Figure 4:
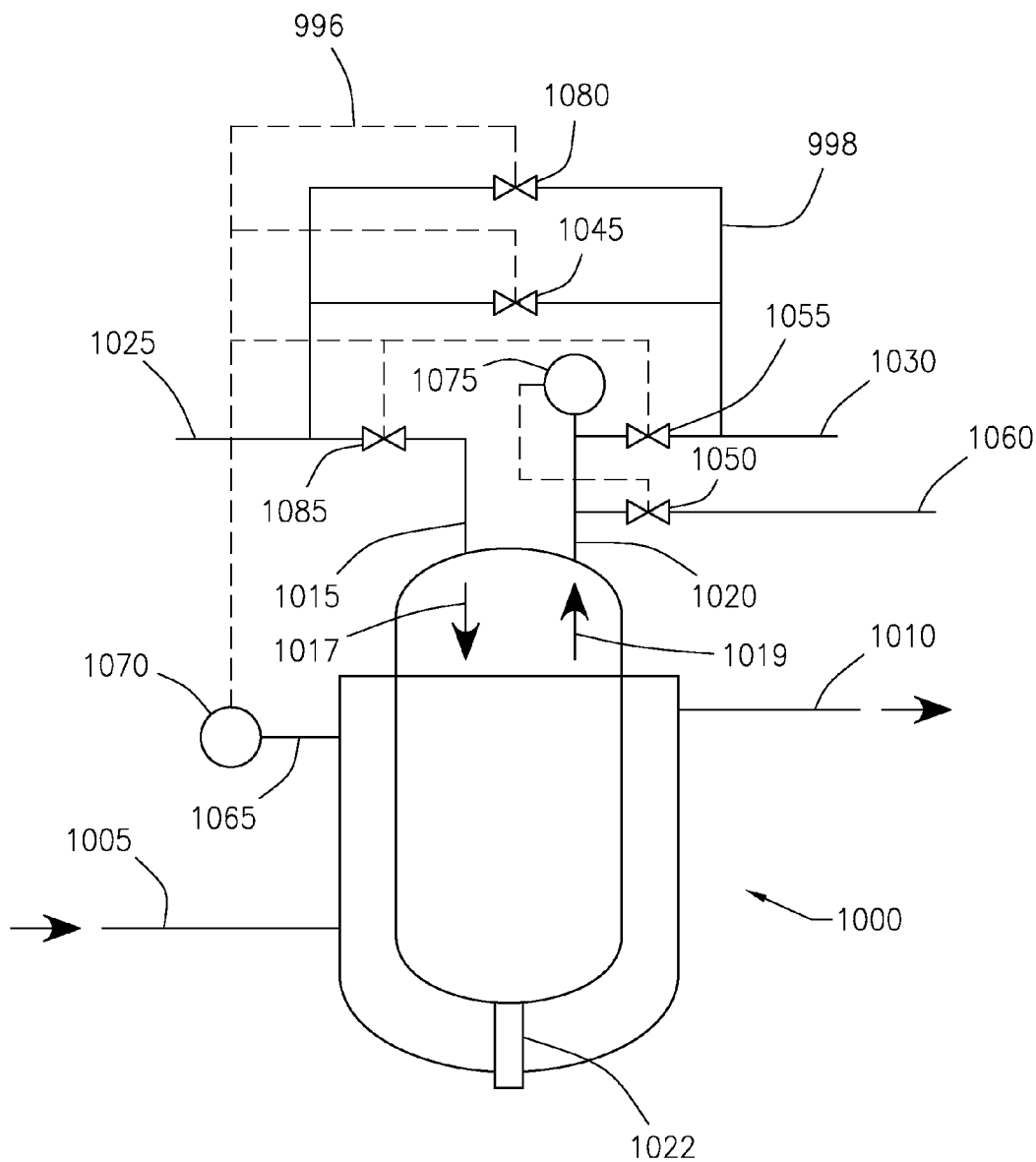
FIG. 4 is a simplified schematic illustration of a fuel system including a fuel vaporizer system according to an exemplary embodiment of the present invention.

FIG. 4 is a schematic illustration of an additional exemplary embodiment of the present invention including exempt cold-start and high load provisions. Electrical paths are represented by dashed lines 996 while fluid paths are represented by solid lines 998. The vaporizer system 1000 represented diagrammatically includes a coolant inlet 1005 and a coolant outlet 1010.

The vaporizer 1000 further includes a liquid fuel inlet 1015 as shown by arrow 1017 and a vaporized fuel outlet 1020 as shown by arrow 1019. A drain or liquid fuel outlet 1022 may be included. Liquid fuel is supplied from the fuel tank via a fuel line 1025 and a fuel line 1030 supplies fuel in liquid and/or vapor form to at least one combustion region of an engine 800. A high-load liquid fuel and cold start liquid fuel by-pass valve 1045 are illustrated.

Referring again to FIG. 4, under normal operating conditions (i.e., the engine coolant is at operating temperature, the engine under normal load conditions) the heated engine coolant enters the vaporizer system through the coolant inlet line 1005 and exits the vaporizer system through the coolant outlet line 1010. The liquid fuel is introduced from the fuel tank, along the liquid fuel line 1025, through a valve 1085, and into the vaporizer liquid fuel inlet 1015. Vaporized fuel exits the vaporizer chamber at the vaporized fuel outlet 1020, through a valve 1055, and to the at least one combustion region of the engine through the fuel line 1030.

With the engine under cold start conditions, the temperature sensor 1070 in communication with the coolant circulating into the vaporizer chamber 1000 indicates that the coolant is not at the normal operating temperature, generally between 180° F. and 220° F. An electrical signal is sent from the temperature sensor 1070 to the cold-start liquid fuel bypass valve 1045 opening the valve, allowing liquid fuel to pass from the fuel line 1025 to line 1030 in liquid form to ensure the at least one combustion region receives the necessary fuel for proper operation. Further, when the coolant temperature is below normal operating temperature, the temperature sensor 1070 sends a signal to the valve 1085 and valve 1055 to close, or to remain closed. This prevents liquid fuel from entering the vaporizer chamber which would fill the vaporizer with liquid fuel and delay or prevent the vaporizer from reaching the temperature necessary to vaporize the fuel.

While operating under normal conditions as defined above, an internal combustion engine 800 may experience demand for high power, which may occur in a vehicle engine while accelerating, passing, or going up hill or in a generator engine when the wattage demand is increased by an added electrical load. Under these conditions, an instantaneous spike in fuel demand may not be sufficiently accommodated by a vaporizer chamber sized for optimum efficiency for the application; therefore additional fuel may be required. As shown in FIG. 4, a high-load liquid fuel bypass valve 1040 is provided to allow liquid fuel to pass the vaporizer 1000 sending liquid fuel from fuel line 1025, through the high-load liquid fuel by-pass valve 1045, and through fuel line 1030 to the combustion region. In such a scenario, valve 1085 and valve 1055 may or may not be closed as the liquid fuel bypassing through valve 1045 may supplement the vaporized fuel produced by the vaporizer. The high-load liquid fuel bypass valve control signal 1080 may be provided by an electrical signal from a control module, such as from a vehicle's power control module (PCM) or a generator's engine controller, or a vacuum switch using increased intake manifold vacuum as an indication of increased power demand.

Referring again to the schematic diagram of FIG. 4, after the vaporizer system has been operating at steady-state operating temperatures for a time, the vaporizer will retain a significant amount of heat. When the engine is turned off, the coolant flow to the vaporizer may also cease, though generation of vapor within the chamber may continue for some time, particularly if any fuel puddling had previously occurred within the vapor chamber. In the illustrated example, a blow-off valve 1050 is provided to allow excess pressure built up in the vaporizer chamber to be returned safely to the fuel system while limiting the maximum pressure in the vapor chamber. A fuel-pressure regulator 1075 may provide a signal to a valve, or the valve may be configured to open upon reaching a pre-determined threshold pressure.

Fuel efficiency and gas mileage were tested on three separate vehicles over a period of five months utilizing the present invention. In each case, addition of the present invention to the internal combustion engine of each vehicle resulted in increases in the miles per gallon of over 125%.

Recent testing of emissions from vehicles utilizing the present invention show marked improvement in the following areas of governmental emissional requirements—lowered hydrocarbon (HC) content of at least 25%, lowered nitrous oxide (NOx) content of at least 70% and raised oxygen ($O_2$) content of at least 75%.

As shown on the chart below, the emissions of nitrous oxide and hydrocarbon resulting from testing were significantly reduced.

| Emissions: | Vapor System | Raw Gasoline | Improvement |
|---|---|---|---|
| NOx (Nitrous-Oxide) | 42 ppm | 158 ppm | 73.4% |
| HC (Hydro-Carbon) | 6 ppm | 8 ppm | 25% |
| O2 | .08 ppm | .39 ppm | 79.5% |
| Co2 | 14.28 ppm | 14.06 ppm | (0%) |

Whereas, the present invention has been described in relation to the drawings attached hereto, it should be understood that other and further modifications, apart from those shown or suggested herein, may be made within the spirit and scope of this invention.

What is claimed is:

1. A fuel vaporizer system for an internal combustion engine, comprising:
   a first closed chamber defining a first volume, said closed chamber having a heat transfer surface, wherein said first closed chamber is a pressure chamber having a cylindrical center and spherical ends;
   a second closed chamber at least partially surrounding the first closed chamber defining a second volume;
   a liquid fuel supply system comprising a liquid fuel supply line to emit into the first volume liquid fuel spray from at least one orifice;
   a thermal fluid system from said engine configured to circulate heated fluid through the second volume and transfer heat from the heated fluid through the first closed chamber and vaporize said liquid fuel;
   a vaporized fuel outlet configured to direct vaporized fuel from the first closed chamber to supply fuel to at least one combustion region of the internal combustion engine via a combustion fuel supply line; and
   a liquid fuel bypass configured to allow liquid fuel to pass from the liquid fuel supply line to the combustion fuel supply line.

2. A fuel vaporizer system according to claim 1 wherein the heat transfer surface comprises a wall.

3. A fuel vaporizer system according to claim 1 wherein the liquid fuel bypass is configured to be opened only when the first closed volume cannot supply sufficient vaporized fuel to satisfy demands of the internal combustion engine.

4. A fuel vaporizer system according to claim 1 further comprising a liquid fuel return drain outlet configured to return non-vaporized fuel to the liquid fuel supply system.

5. A method of supplying fuel to at least one combustion region of an internal combustion engine, comprising:
   circulating a heated fluid through a chamber that at least partially surrounds a vapor chamber;
   transferring heat from the heated fluid to the vapor chamber;
   supplying substantially liquid fuel to the vapor chamber via a liquid fuel supply line;
   vaporizing the substantially liquid fuel in the vapor chamber to create a super-atmospheric pressurized fuel vapor;
   expelling the super-atmospheric pressurized fuel vapor from the vapor chamber to a combustion chamber fuel supply line;
   ensuring sufficient fuel to meet fuel demands of the combustion region by opening, at least partially, a liquid fuel bypass valve upon receiving a signal; and
   at least partially bypassing the vapor chamber by diverting liquid fuel from the liquid fuel supply line to the combustion chamber fuel supply line through the liquid fuel bypass valve.

6. A method of supplying fuel to at least one combustion region according to claim 5, further comprising:
   returning liquid fuel from the vapor chamber to the liquid fuel supply line.

* * * * *